United States Patent
Izquierdo González

(10) Patent No.: US 7,623,642 B2
(45) Date of Patent: Nov. 24, 2009

(54) SYSTEM AND METHOD FOR PLAYING CALL INDICATIONS FOR TELECOMMUNICATIONS SYSTEMS AT LEAST PARTIALLY IMPLEMENTED IN COMPUTER FILE ACCESS NETWORKS

(75) Inventor: Julio Izquierdo González, Madrid (ES)

(73) Assignee: Genexies Mobile, S. L., Madrid (ES)

( * ) Notice: Subject to any disclaimer, the term of this patent is extended or adjusted under 35 U.S.C. 154(b) by 1069 days.

(21) Appl. No.: 11/165,377

(22) Filed: Jun. 23, 2005

(65) Prior Publication Data

US 2006/0258405 A1   Nov. 16, 2006

(30) Foreign Application Priority Data

May 13, 2005   (ES) ................................ 200501159

(51) Int. Cl.
*H04M 3/42* (2006.01)
(52) U.S. Cl. ................................ 379/201.01; 455/414.1
(58) Field of Classification Search ............... 455/414.1; 379/201.01
See application file for complete search history.

(56) References Cited

U.S. PATENT DOCUMENTS

| | | | |
|---|---|---|---|
| 6,374,102 B1 * | 4/2002 | Brachman et al. | 455/422.1 |
| 6,819,945 B1 * | 11/2004 | Chow et al. | 455/567 |
| 6,961,559 B1 * | 11/2005 | Chow et al. | 455/414.1 |
| 2006/0251232 A1 * | 11/2006 | Wuthnow et al. | 379/201.01 |

* cited by examiner

*Primary Examiner*—Creighton Smith
(74) *Attorney, Agent, or Firm*—Klauber & Jackson, LLC

(57) ABSTRACT

This invention is especially intended for playing Ring Tones (referred to hereinbelow as "RT's") on a called computer terminal, and/or Ring Back Tones (referred to hereinbelow as "RBT's") on the calling computer terminal, in voice communications selected from users of different computer terminals, mainly personal computers (referred to hereinbelow as "PC's") by means of a network which is at least partially a data network capable of supporting voice, such as the Internet. RT's and/or RBT's are played by means of a continuous download of said tones (referred to hereinbelow as "streaming") given that neither RT nor RBT are present at any time on any of the PC's, but rather are downloaded from a remote server where RT's and/or RBT's are located. In general, the user of the called PC will be the one determining what RT and/or RBT will be played in terms of the different optional factors such as which calling PC is involved.

20 Claims, 1 Drawing Sheet

SYSTEM AND METHOD FOR PLAYING CALL INDICATIONS FOR TELECOMMUNICATIONS SYSTEMS AT LEAST PARTIALLY IMPLEMENTED IN COMPUTER FILE ACCESS NETWORKS

CROSS REFERENCE TO RELATED APPLICATIONS

The present application claims priority from Spanish Application Serial No. P200501159, filed on May 13, 2005. Applicants claim priority under 35 U.S.C. §119 as to the said Spanish application, and the entire disclosure of said application is incorporated herein by reference in its entirety.

BACKGROUND OF THE INVENTION

Systems and Methods for playing Ring Back Tones (RBT's) on a calling mobile phone, voice communications between conventional telephony users by means of a conventional (fixed or mobile) telephone network without access to computer file access networks, such as the Internet currently alqueryy exist. In addition thereto, said RBT's were played by having to store the RBT which is going to be heard on the calling telephone terminal previously in the called telephone terminal.

However, there is no record of the existence to date of this being done selected from computer terminals (mainly personal computers) for voice communications selected from users of said computer terminals by means of a network which is at least partially a data network affording the possibility of supporting voice, such as the Internet. Likewise, there is no record of said RBT's being played to date on the communications terminal by means of streaming of said tones, avoiding (both technically and commercially advantageous) said RBT's from having to be present on any of said computer terminals. Likewise, there is no record to date of the Ring Tones (RT's) being played by means of this same continuous download (streaming) method.

OBJECT OF THE INVENTION

A first object of the invention is a System provided with means for playing Ring Tones (RT's) on a called computer terminal, and/or Ring Back Tones (RBT's) on the calling computer terminal, in voice communications between users of computer terminals, mainly personal computers (PC's) by means of a network which is at least partially a data network affording the possibility of supporting voice, such as the Internet. Said System is provided with means of playing RT's and RBT's by means of the continuous download (streaming) of said tones, it therefore not being necessary at any time for the RT or the RBT to be present on any of the PC's, but rather said means downloading the RT's and/or RBT's off a remote server where they are resident. Optionally, the System is provided with means enabling the user of the called PC to determine which RT and/or RBT will be played, in terms of different likewise optional factors, as well as which calling PC is involved.

A second object of the invention is a Method for playing Ring Tones (RT's) on a called computer terminal and/or Ring Back Tones (RBT's) on the calling computer terminal in voice communications between users of said computer terminals, mainly personal computers (PC's) by means of a networks which is at least partially a data network capable of supporting voice, such as the Internet. Said Playing Method makes it possible to play RT's and/or RBT's by means of a continuous download (streaming) of said tones, it therefore not being necessary at any time for RT or RBT to be present at any time on any of the PC's, but rather they are downloaded off a remote server where said RT's and/or RBT's are resident. Optionally, the Method enables the user of the called PC to determine what RT and/or RBT will be played, in terms of different likewise optional factors, such as which PC is calling.

DESCRIPTION OF THE INVENTION

As it is being claimed, the present invention is that of a System which, in the most basic embodiment thereof, comprises:

a minimum of two communications terminals, of which: at least one of said communications terminals is a called-receiver terminal, said called-receiver terminal being a computer terminal with connectivity to computer file access networks which is provided with at least:
  a terminal user-to-user communications software application, and
  a computer software application for playing multimedia files; and
at least one other of said communications terminals is a call-originator terminal selected from: a telephone terminal without connectivity to computer file access networks, and
a computer terminal with connectivity to computer file access networks, provided with at least:
  a terminal user-to-terminal user communications software application, and
  a software application for playing multimedia files;
a computer file access network, said computer file access network being provided with means of transmitting computer communications data between:
  the called-receiver terminal, and
  a communications node with the call-originator terminal, selected from:
    the call-originator terminal proper, for communications systems fully implemented in computer file access networks, and
    a telephone network access point with connectivity with the call-originator terminal for communications systems solely partially implemented in computer file access networks;
a computerized call indicator server, provided with at least:
  means of storing at least one type of computerized call indication, selected from:
    computerized call indications for call-originator terminals (Ring Back Tones),
    computerized call indications for called-receiver terminals (Ring Tones), and
    combinations of said types of computerized call indications, and
  means of real-time transmission of the computerized call indications requested thereof;
a user profile database provided with at least:
  means of storing computerized associations between at least:
    a computerized call indication, and
    at least one computerized user identifier, selected at least from computerized called-receiver terminal user identifiers
  means of querying computer associations which, based on at least one computerized user identifier stored in said user profile database, make it possible to obtain the computerized call indication associated to said computerized user identifier and require it to the computerized call indication server;

in which the novel aspects of said Call Indication Player System comprise:

at least a computer software application for requesting and receiving call indications which is resident in at least one of the communications terminals selected from computer terminals, said computer application for requesting and receiving call indications being provided with at least:

means of detecting call requests which interact with the user-to-user communications software application for detecting events selected from at least:

call request initiation event, and call request termination event;

means of transmitting computerized user identifiers which, when the call request initiation event is detected by the call detection means, sending at least one computerized user identifier to the user profile database by selecting at least from computerized called-receiver terminal user terminal identifiers;

means of real-time reception of the computerized call identifiers supplied from the computerized call identifier server, which activate the multimedia file playback software application on the computer terminal for directly playing back the computerized call indication received directly in real-time, without said computerized call indicator therefore being stored prior to or at the time of the call on said computer terminal where it is played;

means of interrupting the computerized call indications which, when the call request termination event detected by the call detection means occurs, deactivate the multimedia file playback software application on the computer terminal, therefore interrupting the direct, real-time playback of the computerized call indication received on the computer terminal; said call request termination event being selected from: call acceptance, call rejection and call acceptance time up.

According to a particular embodiment of the invention of said Call Indication Player System, including: the computerized ring tones are computerized call indications for called-receiver terminals (Ring Tones); and the software application for requesting and receiving call indications is implemented as a first call indication request and reception software application which is resident in the called-receiver terminal, where the means for the real-time reception of the computerized call indicators of said first call indication request and reception software application activate the multimedia file playback software application on the called-receiver terminal in order to play directly, in real time, the computerized call indication received for said called-receiver terminal (Ring Tone) which the user of the called-receiver terminal has associated for said called-receiver terminal without said computerized call indication for the called-receiver terminal (Ring Tone) therefore being stored either prior to or at the time of the call in said called-receiver terminal where it is played.

According to another particular embodiment of the invention of said Call Indication Player System, the following is included:

the computerized call indications are computerized call indications for call-originator terminals (Ring Back Tones); and the call indication request and reception software application is implemented as a second call request and reception software application which is resident in the call-originator terminal, where the means for the real-time reception of the computerized call indication from said second call request and reception indicator software application activate the multimedia file player software application of the call-originator terminal in order to directly play in real time the computerized call indication received for said call-originator terminal (Ring Back Tone) which the user of the call-receiver terminal has associated to said call-originator terminals, without said computerized call indication for the call-originator terminal (Ring Back Tone) being stored prior to or at the time of the call in said call-originator terminal on which it is played.

According to another particular embodiment of the invention of said Call Indication Player System, the following is included:

the computerized call indications include both computerized call indications for called-receiver terminals (Ring Tones) as well as computerized call indications for call-originator terminals (Ring Back Tones):

the first call request and reception indication software application is resident in the called-receiver terminal for directly playing in real time the computerized call indication received for said called-receiver terminal (Ring Tone) which the called-receiver terminal user has associated to said called-receiver terminal, without said computerized call indication for the called-receiver terminal (Ring Tone) therefore being stored prior to or at the time of the call on the called-receiver terminal on which it is played; and the second call request and reception indication software application is resident in the call-originator terminal for directly playing in real time the computerized call indication received for said call-originator terminal (Ring Back Tone) which the called-receiver terminal user has associated to said call-originator terminal, without said computerized call indication for the call-originator terminal (Ring Tone) therefore being stored prior to or at the time of the call on the call-originator terminal on which it is played.

According to another particular embodiment of the invention of said Call Indication Player System, includes that the call request detection means are implemented, at least partially, by means of at least one means of interaction with the user-to-user communication software application, selected from:

application programming interface (API) of said user-to-user communications software application, said application programming interface (API) including a set of communications specifications making it possible for the call request detection means to be able to interact with the user-to-user communications software application by means of the application programming interface (API) thereof;

computer terminal operating system ((OS) commands which are used by the user-to-user communications software application present in said computer terminal making it possible for the call request detection means to be able to interact with the user-to-user communications software application by means of the detection and interpretation of said computer terminal operating system (OS) commands;

a first integrated software application comprised of at least:

the user-to-user communications software application, with the call request and reception indication software application to which said call request detection means pertain, said first integrated software application including a single set of commands in common for said software applications which makes it possible for the call request detection means to be able to interact directly with the user-to-user communications software application; and combinations of said means of interaction with the user-to-user communications software application.

According to another particular embodiment of the invention of said Call Indication Player System includes that the means for the real-time reception of the computerized call indications and the means of interrupting the computerized call indications are implemented, at least partially, by means of at least one means of interacting with the multimedia file player software application, selected from:

application programming interface (API) of said multimedia file player software application, said application programming interface (API) comprises a set of communications specifications making it possible for the means for the real-time reception of the computerized call indications and the means for interrupting the computerized call indications to be able to interact with the multimedia file player software application by means of the application programming interface (API) thereof;

the computer terminal operating system (OS) commands employed by the multimedia file player software application present on said computer terminal, which make it possible for the means for the real-time reception of the computerized call indications and the means for interrupting the computerized call indications to be able to interact with the multimedia file player software application by means of the interpretation of said operating system (OS) commands of the computer terminal;

a second integrated software application integrating at least:

the user-to-user communications software application, with the call indication request and reception software application to which said means of real-time reception of the computerized call indications and said means of interrupting the computerized call indications pertain, said second integrated software application comprising a single set of commands in common for said software application which makes it possible for the means for the real-time reception of the computerized call indications and the means for interrupting the computerized call indications to be able to interact directly with the multimedia file player software application; and combinations of said means of interaction with the multimedia file player software application.

According to another particular embodiment of the invention of said Call Indication Player System, including that the user-to-user communications software application and the multimedia file player software application are implemented in one same software application.

According to another particular embodiment of the invention of said Call indication Player System, including that:

the user profile database associations storage means make it possible to store associations between:

a computerized call indication, a computerized called-receiver terminal user identifier and also selected from at least one discriminating associations element selected from:

computerized call-originator terminal User identifier, cluster of computerized call-originator terminal user identifier specific timeframe, specific date, indicator of use of default computerized call indication, indicator of use of random computerized call indication, indicator of use of advertising computerized call indication, and combinations of said associated discriminating elements;

the means for querying user profile database associations, based on:

a computerized called-receiver terminal user identifier, and at least one of said associated discriminating elements, making it possible to obtain the computerized call indication associated to said computerized user identifier and to said at least one associated discriminating element and to request the same from the computerized call indication server;

the means for transmitting computerized user identifiers pertaining to the call request and reception indication software application:

when the call request-initiating even is detected by the call detection means, and at least in cases in which at least on associated discriminating element is selected from:

the computerized call-originator terminal user identifier the cluster of computerized call-originator terminal user identifiers, said means of transmitting computerized user identifiers transmit to the user profile database at least:

one computerized called-receiver terminal user identifier and, in addition thereto, a computerized call-originator terminal user identifier.

According to another particular embodiment of the invention of said Call Indication Player System, including a user profile management application accessible from the called-receiver terminal for enabling the user of said called-receiver terminal to perform at least one management procedure selected from: creation, edition, deletion and combinations of said management procedures for managing at least one element pertaining to the computer associations stored in the user profile database, selected from:

computerized call indications associated to a computerized called-receiver terminal user identifier, discriminating elements associated to a computerized called-receiver terminal user identifier, and combinations thereof.

According to another particular embodiment of the invention of said Call Indication Player System, including meeting the requirements of at least one of the following characteristics, selected from:

at least one of the computer terminals is selected from: laptop computers with connectivity to computer file access networks, desktop computers with connectivity to computer file access networks and personal electronic notebooks (PDA's) with connectivity to computer file access networks; at least one of the user-to-user communications software applications includes a voice communications application (VoAP) on Internet (IP) protocol;

at least one of the multimedia file player software applications is selected from: sound player applications, image display applications, video player applications, text display applications and combinations of said applications; the telephone terminal is selected from: fixed telephone terminals without connectivity to computer file access networks, mobile telephone terminals without connectivity to computer file access networks and personal electronic notebooks without connectivity to computer file access networks;

at least part of the computer file access network is selected from: Internet, Intranet, Extranet and combinations of said types of networks;

at least part of the communications data transmission means include a Transfer Control Protocol (TCP) according to an Internet Protocol (IP) and a technology for user voice transmission (VoAP) via Internet in order to make it possible to convert a voice signal into compressed data packages which are carried over computer file access networks;

the computerized call indication server is accessible, at least partially, from the computer file access network;
the real-time computerized call indication transmission means entail at least one computer module implemented in at least one language selected from:
active server pages (ASP) language
pre-hypertext processing (PHP) language
Java server pages (JSP) language,
and combinations thereof,
in order to make a computer data transfer rate that will guarantee the real-time transmission of the computerized call indications which are requested thereof possible;
at least one of the computerized call indications is selected from: sound files, image files, video files, text files and combinations thereof;
the user profile database is resident, at least partially, in a location selected from:
the computerized call indication server;
at least one of the communications terminals selected from computer terminals, said user profile database being integrated, at least partially, within a computer module selected from:
the user-to-user communications software application,
the call indication reception and request software application,
an application for accessing said user profile database, and combinations of said computer modules;
the computer file access network; and
combinations of said locations;
at least one of the computerized user identifiers is selected from: alphanumerical reference code assigned to the user by a software application selected from the user-to-user software application and the call request and reception software application, alphanumerical password assigned to the user, the user's telephone terminal number, IP address employed by the user's computer terminal, the user's e-mail address, at least one user contact item of data, at least one user invoicing item of data and combinations of said computerized user identifiers;
the user profile management application is resident, at least partially, in a location selected from:
the computerized call indication server,
the called-receiver terminal, said user profile management application being integrated, at least partially, into a computer module selected from:
the user-to-user communications software application,
the call request and reception indication software application
a specific user profile management application, and combinations of said computer modules;
a connection to the computer file access network, and combinations of said locations; and
combinations of said characteristics.

Analogously, and as is also being claimed, the present invention is a Method which, is the most basic embodiment thereof, comprises:
a minimum of two communications terminals, of which:
at least one of said communications terminals is a called-receiver terminal, said called-receiver terminal being a computer terminal with connectivity to computer file access networks, which performs at least:
a communications terminal user intercommunication task
a multimedia file-playing task; and
at least one other of said communications terminals is a call-originator terminal without connectivity to computer file access networks, and
a telephone terminal without connectivity to computer file access networks, and a computer terminal with connectivity to computer file access networks which performs at least:
the task of intercommunicating communications terminal users and
the task of playing multimedia files;
a computer file access network, which transfers communications computer data selected from:
the called-receiver terminal, and
a communications node with the call-originator terminal, selected from:
the call-originator terminal proper for communications systems fully implemented in computer file access networks, and
a telephone network access point with connectivity with the call-originator terminal for communications systems solely partially implemented in computer file access networks;
a computerized call indication server, which performs at least:
one task of storing at least one type of computerized call indications, selected from:
computerized call indications for call-originator terminal (Ring Back Tones),
computerized call indications for called-receiver terminals (Ring Tones), and
combinations of said types of computerized call indications; and
a task of transmitting in real time the computerized call indications requested thereof
a user profile database which performs at least:
a task of storing associations selected from at least:
one computerized call indication, and
at least one computerized user identifier selected from at least computerized called—receiver terminal user identifiers;
a task of querying computer associations, where, based on at least one computerized user identifier stored in said user profile database, it comprises obtaining the computerized call indication associated to said computerized user identifier and requests the computerized call indication server;
in which the novel aspects of said Call Indication Player Method comprise:
a task of requesting and receiving call indication from at least one of the communications terminals selected from computer terminals, said of requesting and receiving call indications comprising at least:
a sub-task of detecting call requests which interacts with the task of intercommunicating communications terminal users for detecting events selected from at least:
call request initiation event, and
call request termination event;
a sub-task of transmitting computerized user identifiers which, when the call request initiation event detected by the sub-task of detecting call requests occurs, comprises transmitting to the user profile database at least one computerized user identifier by selecting at least from computerized called-user terminal user identifiers;
a sub-task of receiving, in real time, the computerized call indications supplied from the computerized call indication server, comprising performing the task of playing multimedia files from the computer terminal for playing directly, in real time, the computerized call indication received without said computerized call indication therefore being stored prior to or at the time of the call on said computer terminal where it is played;

a sub-task of interrupting the computerized call indications which, when the call request termination even detected by the sub-task of detecting call requests occurs, comprises halting the task of playing multimedia files from the computer terminal, therefore interrupting the direct, real-time playing of the computerized call indication received on the computer terminal; said call request termination event being selected from: call acceptance, call rejection and call acceptance time up.

According to one particular embodiment of the invention of said Call Indication Player Method, including that:

the computerized call indications are computerized call indications for called-receiver terminals (Ring Tones); and the task of requesting and receiving call indications is performed as a first task of requesting and receiving call indications from the called-receiver terminal, where the sub-task of receiving the computerized call indications in real time of said first task of requesting and receiving call indications comprises performing the task of playing multimedia files from the called-receiver terminal to play directly in real time the computerized call indication received for said called-receiver terminal (Ring Tones) that the user of the called-receiver terminal has associated for said caller-receiver terminal, without said computerized call indication for the called-receiver terminal (Ring Tone) being stored prior to or at the time of the call in said called-receiver terminal where it is played.

According to another particular embodiment of the invention of said Call Indication Player Method, including that:

the computerized call indications are computerized call indications for call-originator terminals (Ring Back Tones); and the task of requesting and receiving call indications is performed as a second task of requesting and receiving call indications from the call-originator terminals, where the sub-task of receiving computerized call indications in real time of said second task of requesting and receiving call indications comprises performing the task of playing multimedia files from the call-originator terminal for directly playing in real time the computerized call indication receiver for said call-originator terminal (Ring Back Tone) that the user of the called-receiver terminal has associated for said call-originator terminal, without said computerized call indications for the call-originator terminal (Ring Back Tone) being stored prior to or at the time of the call on said call-originator terminal where it is played.

According to another particular embodiment of the invention of said Call Indication Player Method, including that:

the computerized call indications consist both of computerized call indications for called-receiver terminals (Ring Tones) and computerized call indications for call-originator terminals (Ring Back Tones);

the first task of requesting and receiving call indications is performed from the called-receiver terminal for directly playing in real time the computerized call indication received for said called-receiver terminal (Ring Tone) which the user of the called-receiver terminal has associated for said called-receiver terminal, without said computerized call indication for the called-receiver terminal (Ring Tone) therefore being stored prior to or at the time of the call on said called-receiver terminal where it is played; and the second task of requesting and receiving call indications is performed from the call-originator terminal for playing directly in real time the computerized call indication received for said call-originator terminal (Ring Back Tone) which the user of the called-receiver terminal has associated for said call-originator terminal, without said computerized call indication for the called-receiver terminal (Ring Back Tone) therefore being stored prior to or at the time of the call on said call-originator terminal where it is played.

According to another particular embodiment of the invention of said Call Indication Player Method, including that the sub-task of detecting call requests is performed, at least partially, by means of at least one mode of interaction wit the task of intercommunicating communications terminal users selected from:

Interface for interacting tasks (API) pertaining to said task of intercommunicating communications terminal users, said interface consists for interacting tasks (API) a set of communications specifications making it possible for the sub-task of detecting call requests to be able to interact with the task of intercommunicating communications terminal users by means of the application programming interface (API) thereof;

the computer terminal operating task performance (OS) commands employed by the tasks of intercommunicating communications terminal users present on said computer terminal, which make it possible for the sub-task of detecting call requests to be able to interact with the task of intercommunicating communications terminal users by means of detection and interpretation of said computer terminal operating task (OS) performance commands;

a first integrated task which at least integrates:

the task of intercommunicating communications terminal users, with the task of requesting and receiving call indications to which said sub-task of detecting call requests pertains, said first integrated task comprising a sole set of commands in common for said tasks, which makes it possible for the sub-task of detecting call requests to be able to interact directly with the task of intercommunicating communications terminal users; and combinations of said modes of interaction with the task of intercommunicating communications terminal users.

According to another particular embodiment of the invention of said Call Indication Player Method, including that the sub-tasks of receiving the computerized call indications in real time and of interrupting the computerized call indications are performed, at least partially, by means of at least one mode of interaction with the multimedia file-playing task, selected from:

interface for interacting tasks (API) pertaining to said multimedia file-playing task, said interface for interacting tasks (API) comprising a set of communications specifications which makes it possible for the sub-task of receiving the computerized call indications in real time and the sub-task of interrupting the computerized call indications to be able to interact with the multimedia file-playing task by means of the application programming interface (API) thereof;

operating task performance commands (OS) of the computer terminal which are used by the multimedia file-playing task from said computer terminals which make it possible for the sub-task of receiving computerized call indications in real time and the task of interrupting the computerized call indications to be able to interact with the multimedia file-playing task by means of interpretation of said operating task performance commands (OS) on the computer terminal;

a second integrated task which at least integrates:

the task of intercommunicating communications terminal users, with the task of requesting and receiving call indications to which said sub-task of receiving the computerized call indications in real time and said sub-task of interrupting the computerized call indications pertain, said second integrated task comprising one sole set of commands in common for said tasks, which makes it possible for the sub-task of receiving the computerized call indications in real time and the sub-task of interrupting the computerized call indications to be able to interact directly with the multimedia file-playing task; and combinations of said tasks of interacting with the multimedia file-playing task.

According to another particular embodiment of the invention of said Call Indication Player Method, including that the task of intercommunicating users and the multimedia file-playing task are performed in one same task.

According to another particular embodiment of the invention of said Call Indication Player Method, including that:

the task of storing computer associations from the user profile database, stores computer associations selected from:

a computerized call indication, a computerized called-receiver terminal user identifier, and also selected from at least one associated discriminating element selected from:

computerized call-generator terminal user identifier.

cluster of computerized call-originator terminal user identifiers, specific timeframe, specific date, indicator of use of default computerized call indication, indicator of use of random computerized call indication, indicator of use of advertising computerized call indication, and combinations of said associated discriminating elements;

the task of querying computer associations from the user profile database, based on:

a computerized called-receiver terminal user identifier, and at least one of said associated discriminating elements, comprising obtaining the computerized call indication associated to said computerized user identifier and to said at least one associated discriminating element, and request it from the computerized call indication server;

the sub-task of transmitting computerized user identifiers pertaining to the task of requesting and receiving call indications:

when the call request initiation event detected by the subtask of detecting call requests occurs, and at least in cases in which at least one associated discriminating element is selected from:

the computerized call-originator terminal user identifier, and the cluster of computerized call-originator terminal user identifiers, said sub-task of transmitting computerized user identifiers comprising transmitting to the user profile database at least:

a computerized called-receiver terminal user identifier and, additionally, a computerized call-generator terminal user identifier.

According to another particular embodiment of the invention of said Call indication Player Method, including that a task of managing user profiled from the called-receiver terminal in order to allow the user of said called-receiver terminal at least one management procedure selected from: creation, edition, deletion and combinations of said management procedures for managing at least one element pertaining to the computer associations stored in the user profile database selected from:

computerized call indications associated to a computerized called-receiver terminal user identifier, discriminating elements associated to a computerized called-receiver terminal user identifier, and combinations thereof.

According to another particular embodiment of the invention of said Call Indication Player Method, including that it meets the requirements of at least one of the following characteristics selected from:

at least one of the computer terminals is selected from: laptop computers with connectivity to computer file access networks, desktop computers with connectivity to computer file access networks and personal electronic notebooks (PDA's) with connectivity to computer file access networks;

at least one of the tasks of intercommunicating communications terminal users includes a task of intercommunicating by user voice (VoAP) on Internet (IP) protocol;

at least one of the multimedia file-playing tasks is selected from: sound-playing tasks, image-display tasks, video-playing tasks, text-display tasks and combinations of said tasks;

the telephone terminal is selected from: fixed telephone terminals without connectivity to computer file access networks, mobile telephone terminals without connectivity to computer file access networks and personal electronic notebooks without connectivity to computer file access networks;

at least part of the computer file access network is selected from: Internet, Intranet, Extranet and combinations of said types of networks;

at least part of the communications computer data-transmitting task includes a Transfer Control Protocol (TCP) according to an Internet Protocol (IP) and transmitting user voice (VoAP) via Internet, for converting a voice signal into compressed packages which are carried over computer file access networks;

the computerized call indication server is accessible, at least partially, from the computer file access network;

the task of transmitting the computerized call indications in real time entails at least one task implemented in at least one language selected from:

active server pages (ASP) language pre-hypertext processing (PHP) language

Java server pages (JSP) language, and combinations thereof, in order to make a computer data transfer rate that will guarantee the real-time transmission of the computerized call indications which are requested thereof possible;

at least one of the computerized call indications is selected from: sound files, image files, video files, text files and combinations thereof;

the user profile database is resident, at least partially, in a location selected from:

the computerized call indication server;

at least one of the communications terminals selected from computer terminals, said user profile database managed, at least partially, by a task selected from:

the task of intercommunicating users, the call indication reception and request software application, the task of requesting and receiving call indications, and a task of accessing said user profile database, and combinations of said tasks;

the computer file access network; and combinations of said locations;

at least one of the computerized user identifiers is selected from: alphanumerical reference code assigned to the user by a task selected from the task of intercommunicating communications terminal users and the task of requesting and receiving calls, an alphanumerical password assigned to the user, the user's telephone terminal number, IP address employed by the user's computer terminal, the user's e-mail address, at least one user contact item of data, at least one user invoicing item of data and combinations of said computerized user identifiers;

the user profile management task is performed, at least partially, in a location selected from:

the computerized call indication server, the called-receiver terminal, said user profile management task being integrated, at least partially, into a task selected from:

the task of intercommunicating communications terminal users, the task of requesting and receiving call indications, the specific task managing user profiles and combinations of said tasks;

a connection to the computer file access network, and combinations of said locations; and combinations of said characteristics.

DESCRIPTION OF AN EMBODIMENT OF THE INVENTION

Figure 1:
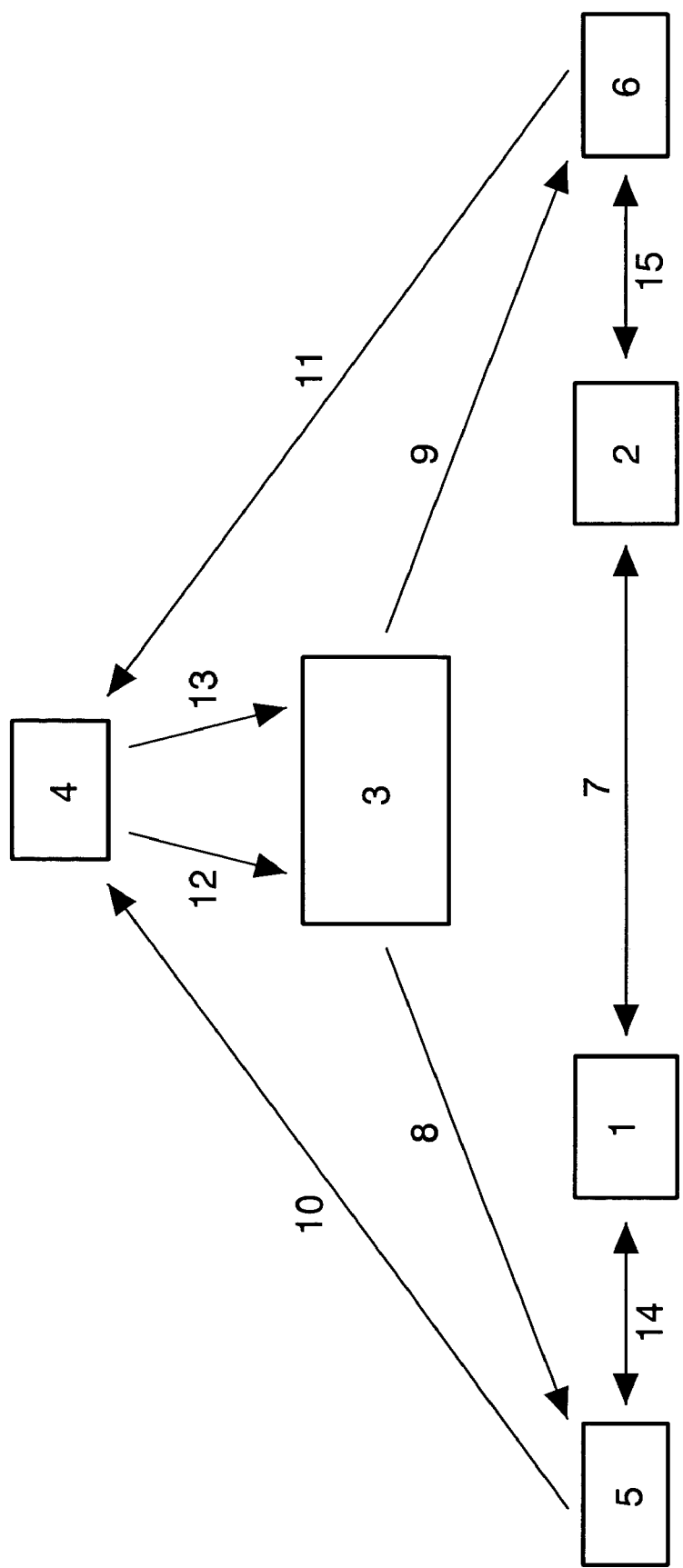
FIG. 1: Shows a block diagram on which, by means of numerical references to which reference shall be made at a further point herein, the basic devices involved in the invention as well as the way in which the same interact are illustrated.

According to a particular embodiment of the invention (and until the user of the called-receiver PC user (2) accepts or rejects the call request, or said call request runs out as a result of not having been answered following a certain length of time), the playing on the call-originator PC (1) of a Ring Back Tone (computerized call indication for call-originator terminals) is achieved by means of continuous real-time downloading (streaming), for which the System according to said particular embodiment of the invention would consist of:

a minimum of two PC's (or communications terminals) (1, 2):

one PC is a called-receiver terminal (2) with connectivity to Internet and provided with:

a PC-user-to-PC user communications (VoAP) software application (1, 2), and a multimedia file player software application; and the other PC is a call-originator terminal (1) with connectivity to Internet, provided with:

a PC user-to-PC user communications (VoAP) software application (1, 2), and a multimedia file player software application;

a computer file access network such as Internet, said computer file access network being provided with communications (VoAP) computer data transmission means between:

the call-originator PC (1), and the called-receiver PC (2);

a Ring Back Tone server (or computerized ring back indications) (3), provided with:

Ring Back Tone storage means; and means of real-time transmitting the Ring Back Tones requested thereof;

a user profile database (4) provided with: means of storing computer associations selected from at least:

a Ring Back Tone, a computerized call-originator PC user identifier (1), and a computerized called-receiver PC user identifier (2);

means of querying computer associations which, based on the computerized call-originator PC (1) user identifiers and the called-receiver PC (2) ones, make it possible to obtain the Ring Back Tone associated to said identifiers by requesting it from the computerized call indication server (3);

a software application for requesting and reception of call indications (5) from the call-originator terminal (1) provided with:

call request detection means which interact with the user-to-user (VoAp) communications software application for detecting events selected from:

call request initiation event (7), and call request termination event (7);

means of transmitting computerized call-originator PC (1) and called-receiver PC (2) user identifiers which, when the call request initiation event (7) detected by the call detection means occurs, transmit to the user profile database (4) the computerized call-originator PC (1) and called-receiver PC (2) identifiers;

means of real-time reception of the Ring Back Tones supplied from the Ring Back Tone server (3), which activate the multimedia file player software application on the call-originator PC (1) for playing directly in real time the Ring Back Tone received which the called-receiver terminal (2) user has associated for said call-originator terminal (1), without said computerized call indication for the call-originator terminal (Ring Back Tone) therefore being stored prior to or at the time of the call on said call-originator terminal (1) on which it is played;

means of interrupting the Ring Back Tones which, when the call request termination event (7) detected by the call detection means occurs, they deactivate the multimedia file player software application on the call-originator PC, there interrupting the direct, real-time playing of the Ring Back Tone received by the call-originator PC (1); said call request termination event (7) being selected from: call acceptance, call rejection and call acceptance time up.

A particular way of achieving this functioning would be for the call request detection means to be implemented by means of an application programming interface (API) of said user-to-user communications software application (VoAP) on the call-originator terminal (1), given that said application programming interface (API) includes a set of communications specifications which makes it possible for the call request detection means to be able to interact with the user-to-use communications (VoAP) software application on the call-originator terminal (1) by means of the application programming interface (API) thereof.

With regard to a particular embodiment of the Method of the invention (and until the called-receiver PC (2) user accepts or rejects the call request, or this request expires as a result of not be answered within a certain period of time), a Ring Back Tone (or computerized call indication for call-originator terminals (1)) is managed to be played by means of continuous real-time download (streaming), for which the means employed would be those corresponding to those of the System described, and the functioning mode according to a particular Method of the present invention would consist of the following steps:

The call-originator PC (1) makes the call (7);

the call indication request and reception software application (5) of the call-originator terminal (1) detects (14) the transmission of this call (7) (by means of the API (application programming interface) and transmits (10) the call-originator PC (1) and called-receiver PS (2) user identifiers to the user profile database (4);

based on the call-originator PC (1) and called-receiver PC (2) user identifiers, the user profile database (4) obtains the Ring Back Tone which the called-receiver PC (2) user has associated to the call-originator PC (1) user who is placing the incoming call (7) and requests (12) said Ring Back Tone from the Ring Back Tone server (3), which, in turn, transmits it (8) to the call indication request and reception software application (5) of the call-originator terminal (1);

by means of said API's (14), said call indication request and reception software application (5) of the call-originator terminal (1) causes said call-originator terminal (1) to play the Ring Back Tone by mans of continuous real-time download (streaming) until the user of the called-receiver PC accepts or rejects the call request or the request expires as a result of not being answered within a certain length of time.

The invention claimed is:

1. A call indication player system for telecommunications systems at least partially implemented in computer file access networks, comprising at least:
    a minimum of two communication terminals of which:
        at least one of said communication terminals is a called-receiver terminal, said call-receiver terminal being a computer terminal with connectivity to computer file access networks, provided at least with:
            a user-to-user communication software application for communication terminals, and
            a multimedia file player software application; and
        at least another of said communication terminals is a call-originator terminal selected from:
            a telephone terminal without connectivity to computer file access networks, and
            a computer terminal with connectivity to computer file access networks provided with at least:
                a user-to-user communication software application for communication terminals, and
                a multimedia file player software application;
    a computer file access network, said computer file access network being provided with communication computer data transmission means between:
        the called-receiver terminal, and
        a communication node with the call-originator terminal, selected from:
            the call-originator terminal, for communication systems fully implemented in computer file access networks, and
            a telephone network access point with connectivity with the call-originator terminal, for communication systems only partially implemented in computer file access networks;
    a computerized call indication server, provided with at least:
        storing means for storing at least one type of computerized call indications, selected from:
            computerized call indications for call-originator terminals (Ring Back Tones);
            computerized call indications called-receiver terminals (Ring Tones), and
            combinations of said types of computerized call indications; and
        real-time transmission means to transmit requested computerized call indications;
    a user profile database provided with at least:
        storing means for storing computer associations selected from at least:
            a computerized call indication, and
            at least one computerized user identifier, selected at least from computerized called-receiver terminal user identifiers;
        querying means for querying computer associations which, based on at least one computerized user identifier stored in said user profile database, enable to obtain the computerized call indication associated to said computerized user identifier and to request said computerized call indication to the computerized call indication server;
    characterized in that said Call Indication Player System additionally comprises:
    at least one call indication request and reception software application located in at least one of the communication terminals selected from computer terminals, said call indication request and reception software application being provided with at least:
        call request detection means which interact with the user-to-user communication software application for detecting events selected from at least:
            call request initiation event, and
            call request termination event;
        transmitting means for transmitting computerized user identifiers which, when the call request initiation occurs detected by the call detection means, transmit to the user profile database at least one computerized user identifier selected at least from computerized called-receiver terminal user identifiers;
        real-time reception means for the computerized call indications supplied from the computerized call indication server, which activate the computer terminal multimedia file player software application for directly playing in real time the computerized call indication received, said computerized call indication therefore neither being stored previously nor afterwards in said computer terminal where the computerized call indication is played;
        interrupting means for interrupting the computerized call indications which, when the call request termination event occurs detected by the call detection means, deactivate the computer terminal multimedia file player software application, therefore interrupting the direct, real-time player of the computerized call indication received in the computer terminal; said call request termination event being selected from: call acceptance, call rejection and call acceptance time up.

2. The call indication player system for telecommunications systems at least partially implemented in computer file access networks according to claim 1, wherein:
    the computerized call indications are computerized call indications for called-receiver terminals (Ring Tones); and
    the call indication request and reception software application is implemented as a first call indication request and reception software application which is located in the called-receiver terminal, where the real-time reception means for real-time reception of the computerized call indications of said first call indication request and reception software application activate the multimedia file player software application of the called-receiver terminal for directly playing in real time the computerized call indication received for said called-receiver terminal (Ring Tone), that the called-receiver terminal user has associated for said called-receiver terminal, said computerized call indication for the called-receiver terminal (Ring Tone) therefore neither being stored previously nor afterwards in said called-receiver terminal where said computerized call indication is played.

3. The call indication player system for telecommunications systems at least partially implemented in computer file access networks according to claim 1, wherein:
the computerized call indications are computerized call indications for call-originator terminals (Ring Back Tones); and
the call indication request and reception software application is implemented as a second call indication request and reception software application which is located in the call-originator terminal, where the real-time reception means for the computerized call indications from said call indication request and reception software application activate the multimedia file player software application of the call-originator terminal for directly playing in real time the computerized call indication received for said call-originator terminal (Ring Back Tone) that the called-receiver terminal user has associated for said call-originator terminal, said computerized call indication for the call-originator terminal (Ring Back Tone) therefore neither being stored previously nor afterwards in said call-originator terminal where said computerized call indication is played.

4. The call indication player system for telecommunications systems at least partially implemented in computer file access networks according to claim 2, wherein:
the computerized call indications comprise both computerized call indications for called-receiver terminals (Ring Tones) and computerized call indications for call-originator terminals (Ring Back Tones),
the first call indication request and reception software application is located in the called-receiver terminal for directly playing in real time the computerized call indication received for said called-receiver terminal (Ring Tone) that the user of the called-receiver terminal has associated for said called-receiver terminal, said computerized call indication for the called-receiver terminal (Ring Tone) therefore neither being stored previously nor afterwards in said called-receiver terminal where said computerized call indication is played; and
the second call indication request and reception software application is located in the call-originator terminal for directly playing in real time the computerized call indication received for said call-originator terminal (Ring Back Tone) that the user of the called-receiver terminal has associated for said call-originator terminal, said computerized call indication for the call-originator terminal (Ring Back Tone) therefore neither being stored previously nor afterwards in said call-originator terminal where said computerized call indication is played.

5. The call indication player system for telecommunications systems at least partially implemented in computer file access networks according to claim 1, wherein the call request detection means are implemented, at least partially, by means of at least one means of interaction with the user-to-user communications software application, selected from:
application programming interface (API) of said user-to-user communications software application, said application programming interface (API) comprising a set of communications specifications which make it possible for the call request detection means to be able to interact with the user-to-user communications software application by means of the application programming interface (API) thereof;
operating system (OS) commands of the computer terminal, employed by the user-to-user communications software application of said computer terminal which make it possible for the call request detection means to be able to interact with the user-to-user communications software application by means of detection and interpretation of said operating system (OS) commands of the computer terminal;
a first integrated software application which at least integrates:
the user-to-user communications software application, with
the call indication request and reception software application to which said call request detection means pertain,
said first integrated software application including a single set of commands in common for said software applications which make it possible for the call request detection means to be able to interact directly with the user-to-user communications software application; and combinations of said means of interaction with the user-to-user communications software application.

6. The call indication player system for telecommunications systems at least partially implemented in computer file access networks according to claim 1, wherein the means for the real-time reception of receiving the computerized call indications and the means of interrupting the computerized call indications are implemented, at least partially, by means of at least one means of interaction with the multimedia file player software application, selected from:
application programming interface (API) of said multimedia player software application, said application programming interface (API) comprising a set of communications specifications which makes it possible for the means for the real-time reception of the computerized call indications and the means of interrupting the computerized call indications are able to interact with the multimedia file player software application by means of the application programming interface (API) thereof;
operating system (OS) commands of the computer terminal, employed by the multimedia file player software application present on said computer terminal, which making it possible for the means for the real-time reception of the computerized call indications and the means of interrupting the computerized call indications to be able to interact with the multimedia file player software application by means of interpretation of said operating system (OS) commands of the computer terminal; a second integrated software application which at least integrates:
the user-to-user communications software application, with
the call indication request and reception software application to which said means for the real-time reception of the computerized call indications and said means of interrupting the computerized call indications pertain,
said second integrated software application including a single set of commands in common for said software applications, which makes it possible for the means for the real-time reception of the computerized call indications and the means for interrupting the computerized call indications to be able to interact directly with the multimedia file player software application; and
combinations of said means of interacting with the multimedia file player application.

7. The call indication player system for telecommunications systems at least partially implemented in computer file access networks according to claim 1, wherein the user-to-user communications software application and the multimedia file player software application are implemented in one same software application.

8. The call indication player system for telecommunications systems at least partially implemented in computer file access networks according to claim 1, wherein:
the means of storing user profile database associations afford the possibility of storing computer associations between:
a computerized call indication,
a computerized called-receiver terminal user identifier and also between at least one associated discriminating element selected from:
computerized call-originator terminal user identifier, cluster of call-originator terminal user identifiers, specific timeframe,
specific date,
indicator of use of default computerized call indication,
indicator of use of random computerized call indication,
indicator of use of advertising computerized call indication, and
combinations of said associated discriminating elements;
the means of querying computer associations of the user profile database, based on:
a computerized called-terminal receiver terminal identifier, and
at least one of said associated discriminating elements, make it possible to obtain the computerized call indication associated to said computerized user identifier and to said at least one associated discriminating element, and to request it from the computerized call indication server;
the means of transmitting computerized user identifiers pertaining to the call indication request and reception software application:
when the call request initiation event detected by the call detection means occurs, and
at least in cases in which at least one associated discriminating element is selected from:
the computerized call-originator terminal user identifier, and
the cluster of call-originator terminal user identifiers,
said means of transmitting computerized user identifiers transmit to the user profile database at least:
a computerized called-receiver terminal user identifier, and additionally,
a computerized call-originator terminal user identifier.

9. The call indication player system for telecommunications systems at least partially implemented in computer file access networks according to claim 1, additionally comprising a user profile management application accessible from the called-receiver terminal in order to enable the user of said called-receiver terminal to perform at least one management procedure selected from: creation, edition, deletion and combinations of said management procedures, for managing at least one element pertaining to the software applications stored in the user profile database selected from:
computerized call indications associated to a computerized called-receiver terminal user identifier,
discriminating elements associated to a computerized called-receiver terminal identifier, and combinations thereof.

10. The call indication player system for telecommunications systems at least partially implemented in computer file access networks according to claim 1, wherein said system meets the requirements of at least one of the following characteristics, selected from:
at least one of the computer terminals is selected from: laptop computers with connectivity to computer file access networks, desktop computers with connectivity to computer file access networks and personal electronic notebooks (PDA's) with connectivity to computer file access networks;
at least one of the user-to-user communications software applications includes a voice communications (VoAP) application on Internet (IP) protocol;
at least one of the multimedia file player software applications is selected from: sound player applications, image display applications, video player applications, text display applications, and combinations of said applications;
the telephone terminal is selected from: fixed telephone terminals without connectivity to computer file access networks, mobile telephone terminals without connectivity to computer file access networks and personal electronic notebooks without connectivity to computer file access networks;
at least part of the computer file access network is selected from: Internet, Intranet, Extranet and combinations of said types of networks;
at least part of the communications computer data transmission means includes a Transfer Control Protocol (TCP) and a technology for user voice transmission (VoAP) via Internet, in order to make it possible to convert a voice signal into compressed data packages which are carried over computer file access networks;
the computerized call indication server is accessible, at least partially, from the computer file access network;
the real-time computerized call indication transmission means entail at least one computer module implemented in at least one language selected from:
active server pages (ASP) language
pre-hypertext processing (PHP) language
Java server pages (JSP) language,
and combinations thereof,
in order to make a computer data transfer rate that will guarantee the real-time transmission of the computerized call indications which are requested thereof possible;
at least one of the computerized call indications is selected from: sound files, image files, video files, text files and combinations thereof;
the user profile database is resident, at least partially, in a location selected from:
the computerized call indication server;
at least one of the communications terminals selected from computer terminals, said user profile database being integrated, at least partially, within a computer module selected from:
the user-to-user communications software application,
the call indication reception and request software application,
an application for accessing said user profile database, and
combinations of said computer modules;
the computer file access network; and
combinations of said locations;
at least one of the computerized user identifiers is selected from: alphanumerical reference code assigned to the user by a software application selected from the user-to-user software application and the call request and reception software application, alphanumerical password assigned to the user, the user's telephone terminal number, IP address employed by the user's computer terminal, the user's e-mail address, at least one user contact item of data, at least one user invoicing item of data and combinations of said computerized user identifiers;

the user profile management application is resident, at least partially, in a location selected from:
  the computerized call indication server,
  the called-receiver terminal, said user profile management application being integrated, at least partially, into a computer module selected from:
    the user-to-user communications software application, the call request and reception indication software application
    a specific user profile management application, and combinations of said computer modules;
  a connection to the computer file access network, and combinations of said locations; and
combinations of said characteristics.

11. A method for playing call indications for telecommunications systems at least partially implemented in COMPUTER FILE ACCESS NETWORKS, comprising at least:
a minimum of two communications terminals, of which:
  at least one of said communication terminals is a called-receiver terminal, said called-receiver terminal being a computer terminal with connectivity to computer file access networks, which performs at least:
    a communication terminal user intercommunication task a multimedia file-playing task; and
  at least another of said communication terminals is a call-originator terminal selected from:
    a telephone terminal without connectivity to computer file access networks, and
    a computer terminal with connectivity to computer file access networks which performs at least:
      the task of intercommunicating communications terminal users, and
      the task of playing multimedia files;
a computer file access network, which transfers communication computer data selected from:
  the called-receiver terminal, and
  a communications node with the call-originator terminal, selected from:
    the call-originator terminal for communications systems fully implemented in computer file access networks, and
    a telephone network access point with connectivity with the call-originator terminal for communication systems only partially implemented in computer file access networks;
a computerized call indication server, which performs at least:
  a task of storing at least one type of computerized call indications, selected from:
    computerized call indications for call-originator terminals (Ring Back Tones),
    computerized call indications for called-receiver terminals (Ring Tones), and
    combinations of said types of computerized call indications; and
  a task of transmitting in real time the computerized call indications requested thereof
a user profile database which performs at least:
  a task of storing associations selected from at least:
    a computerized call indication, and
    at least one computerized user identifier selected from at least computerized called-receiver terminal user identifiers;
  a task of querying computer associations where, based on at least one computerized user identifier stored in said user profile database, it comprises obtaining the computerized call indication associated to said computerized user identifier and requesting said computerized call indication from the computerized call indication server;
characterized in that said Call Indication Player Method also comprises:
a task of requesting and receiving call indications from at least one of the communication terminals selected from computer terminals, said task of requesting and receiving call indications comprising at least:
  a sub-task of detecting call requests which interacts with the task of intercommunicating communications terminal users for detecting events selected from at least:
    call request initiation event, and
    call request termination event;
  a sub-task of transmitting computerized user identifiers which, when the call request initiation occurs detected by the sub-task of detecting call requests, comprises transmitting to the user profile database at least one computerized user identifier selected at least from computerized called-receiver terminal user identifiers;
  a sub-task of receiving in real time the computerized call indications supplied from the computerized call indication server, comprising performing the task of playing multimedia files from the computer terminal for playing directly, in real time, the computerized call indication received, said computerized call indication therefore neither being stored previously nor afterwards in said computer terminal;
  a sub-task of interrupting the computerized call indications which, when the call request termination event occurs detected by the sub-task of detecting call requests, comprises halting the task of playing multimedia files from the computer terminal, therefore interrupting the direct, real-time playing of the computerized call indication received on the computer terminal; said call request termination event being selected from: call acceptance, call rejection and call acceptance time up.

12. The method for playing call indications for telecommunications systems at least partially implemented in computer file access networks, according to claim 11, wherein:
  the computerized call indications are computerized call indications for called-receiver terminals (Ring Tones); and
  the task of requesting and receiving call indications is implemented as a first task of requesting and receiving call indications from the called-receiver terminal, where the sub-task of receiving the computerized call indications in real time of said first task of requesting and receiving call indications comprises performing the task of playing multimedia files from the called-receiver terminal to play directly in real time the computerized call indication received for said called-receiver terminal (Ring Tones) that the user of the called-receiver terminal has associated for said caller-receiver terminal, said computerized call indication for the called-receiver terminal (Ring Tone) therefore neither being stored previously nor afterwards in said called-receiver terminal where said computerized call indication is played.

13. The method for playing call indications for telecommunications systems at least partially implemented in computer file access networks, according to claim 11, wherein:
the computerized call indications are computerized call indications for call-originator terminals (Ring Back Tones); and
the task of requesting and receiving call indications is performed as a second task of requesting and receiving call indications from the call-originator terminal, where the sub-task of receiving computerized call indications in real time of said second task of requesting and receiving call indications comprises performing the task of playing multimedia files from the call-originator terminal for directly playing in real time the computerized call indication received for said call-originator terminal (Ring Back Tone) that the user of the called-receiver terminal has associated for said call-originator terminal, said computerized call indications for the call-originator terminal (Ring Back Tone) therefore neither being stored previously nor afterwards in said call-originator terminal where said computerized call indication is played.

14. The method for playing call indications for telecommunications systems at least partially implemented in computer file access networks implemented in computer file access networks according to claim 12, wherein:
the computerized call indications comprise both computerized call indications for called-receiver terminals (Ring Tones) and computerized call indications for call-originator terminals (Ring Back Tones);
the first task of requesting and receiving call indications is performed from the called-receiver terminal for directly playing in real time the computerized call indication received for said called-receiver terminal (Ring Tone) which the user of the called-receiver terminal has associated for said called-receiver terminal, said computerized call indication for the called-receiver terminal (Ring Tone) therefore neither being stored previously nor afterwards in said called-receiver terminal where said computerized call indication is played; and
the second task of requesting and receiving call indications is performed from the call-originator terminal for playing directly in real time the computerized call indication received for said call-originator terminal (Ring Back Tone) that the user of the called-receiver terminal has associated for said call-originator terminal, said computerized call indication for the called-receiver terminal (Ring Back Tone) therefore neither being stored previously nor afterwards in said called-receiver terminal where said computerized call indication is played.

15. The method for playing call indications for telecommunications systems at least partially implemented in computer file access networks implemented in computer file access networks according to claim 11, wherein the sub-task of detecting call requests is performed, at least partially, by means of at least one mode of interaction with the task of intercommunicating communications terminal users selected from:
interface for interacting tasks (API) pertaining to said task of intercommunicating communications terminal users, said interface consisting, for interacting tasks (API), of a set of communications specifications making it possible for the sub-task of detecting call requests to be able to interact with the task of intercommunicating communications terminal users by means of the application programming interface (API) thereof;
computer terminal operating task performance (OS) commands employed by the tasks of intercommunicating communications terminal users present on said computer terminal, which make it possible for the sub-task of detecting call requests to be able to interact with the task of intercommunicating communications terminal users by means of detection and interpretation of said computer terminal operating task (OS) performance commands;
a first integrated task which at least integrates:
the task of intercommunicating communications terminal users, with
the task of requesting and receiving call indications to which said sub-task of detecting call requests pertains,
said first integrated task comprising a single set of commands in common for said tasks, which makes it possible for the sub-task of detecting call requests to be able to interact directly with the task of intercommunicating communications terminal users; and
combinations of said modes of interaction with the task of intercommunicating communications terminal users.

16. The method for playing call indications for telecommunications systems at least partially implemented in computer file access networks implemented in computer file access networks according to claim 11, wherein the sub-tasks of receiving the computerized call indications in real time and of interrupting the computerized call indications are performed, at least partially, by means of at least one mode of interaction with the multimedia file-playing task, selected from:
interface for interacting tasks (API) pertaining to said multimedia file-playing task, said interface for interacting tasks (API) comprising a set of communications specifications which makes it possible for the sub-task of receiving the computerized call indications in real time and the sub-task of interrupting the computerized call indications to be able to interact with the multimedia file-playing task by means of the application programming interface (API) thereof;
operating task performance commands (OS) of the computer terminal which are used by the multimedia file-playing task from said computer terminal which make it possible for the sub-task of receiving computerized call indications in real time and the task of interrupting the computerized call indications to be able to interact with the multimedia file-playing task by means of interpretation of said operating task performance commands (OS) on the computer terminal;
a second integrated task which at least integrates:
the task of intercommunicating communications terminal users, with
the task of requesting and receiving call indications to which said sub-task of receiving the computerized call indications in real time and said sub-task of interrupting the computerized call indications pertains,
said second integrated task comprising one single set of commands in common for said tasks, which makes it possible for the sub-task of receiving the computerized call indications in real time and the sub-task of interrupting the computerized call indications to be able to interact directly with the multimedia file-playing task; and
combinations of said tasks o interacting with the multimedia file-playing task.

17. The method for playing call indications for telecommunications systems at least partially implemented in computer file access networks implemented in computer file access networks according to claim 11, wherein the task of intercommunicating users and the multimedia file-playing task are performed in one same task.

18. The method for playing call indications for telecommunications systems at least partially implemented in computer file access networks implemented in computer file access networks according to claim 11, wherein:
the task of storing computer associations from the user profile database, stores computer associations selected from:
 a computerized call indication,
 a computerized called-receiver terminal user identifier, and also selected from at least one associated discriminating element selected from:
 computerized call-generator terminal user identifier
 cluster of computerized call-originator terminal user identifiers,
 specific timeframe,
 specific date,
 indicator of use of default computerized call indication,
 indicator of use of random computerized call indication,
 indicator of use of advertising computerized call indication, and
 combinations of said associated discriminating elements;
the task of querying computer associations from the user profile database, based on:
 a computerized called-receiver terminal user identifier, and
 at least one of said associated discriminating elements, comprising obtaining the computerized call indication associated to said computerized user identifier and to said at least one associated discriminating element, and request it from the computerized call indication server;
the sub-task of transmitting computerized user identifiers pertaining to the task of requesting and receiving call indications:
 when the call request initiation event detected by the subtask of detecting call requests occurs, and
 at least in cases in which at least one associated discriminating element is selected from:
  the computerized call-originator terminal user identifier, and
  the cluster of computerized call-originator terminal user identifiers,
 said sub-task of transmitting computerized user identifiers comprising transmitting to the user profile database at least:
  a computerized called-receiver terminal user identifier and, additionally,
  a computerized call-generator terminal user identifier.

19. The method for playing call indications for telecommunications systems at least partially implemented in computer file access networks implemented in computer file access networks according to claim 11, wherein it additionally includes a task of managing user profiles from the called-receiver terminal in order to allow the user of said called-receiver terminal at least one management procedure selected from: creation, edition, deletion and combinations of said management procedures for managing at least one element pertaining to the computer associations stored in the user profile database selected from:
 computerized call indications associated to a computerized called-receiver terminal user identifier,
 discriminating elements associated to a computerized called-receiver terminal user identifier, and
 combinations thereof.

20. The method for playing call indications for telecommunications systems at least partially implemented in computer file access networks implemented in computer file access networks according to claim 11, wherein it meets the requirements of at least one of the following characteristics selected from:
 at least one of the computer terminals is selected from: laptop computers with connectivity to computer file access networks, desktop computers with connectivity to computer file access networks and personal electronic notebooks (PDA's) with connectivity to computer file access networks;
 at least one of the tasks of intercommunicating communications terminal users includes a task of intercommunicating by user voice (VoAP) on Internet (IP) protocol;
 at least one of the multimedia file-playing tasks is selected from: sound-playing tasks, image-display tasks, video-playing tasks, text-display tasks and combinations of said tasks;
 the telephone terminal is selected from: fixed telephone terminals without connectivity to computer file access networks, mobile telephone terminals without connectivity to computer file access networks and personal electronic notebooks without connectivity to computer file access networks;
 at least part of the computer file access network is selected from: Internet, Intranet, Extranet and combinations of said types of networks;
 at least part of the communications computer data-transmitting task includes a Transfer Control Protocol (TCP) according to an Internet Protocol (IP) and transmitting user voice (VoAP) via Internet, for converting a voice signal into compressed packages which are carried over computer file access networks;
 the computerized call indication server is accessible, at least partially, from the computer file access network;
 the task of transmitting the computerized call indications in real time entails at least one task implemented in at least one language selected from:
  active server pages (ASP) language
  pre-hypertext processing (PHP) language
  Java server pages (JSP) language,
  and combinations thereof,
  in order to make a computer data transfer rate that will guarantee the real-time transmission of the computerized call indications which are requested thereof possible;
 at least one of the computerized call indications is selected from: sound files, image files, video files, text files and combinations thereof;
 the user profile database is resident, at least partially, in a location selected from:
  the computerized call indication server;
  at least one of the communications terminals selected from computer terminals, said user profile database managed, at least partially, by a task selected from:
   the task of intercommunicating users,
   the task of requesting and receiving call indications, and
   a task of accessing said user profile database, and combinations of said tasks;

the computer file access network; and
combinations of said locations;

at least one of the computerized user identifiers is selected from: alphanumerical reference code assigned to the user by a task selected from the task of intercommunicating communications terminal users and the task of requesting and receiving calls, an alphanumerical password assigned to the user, the user's telephone terminal number, IP address employed by the user's computer terminal, the user's e-mail address, at least one user contact item of data, at least one user invoicing item of data and combinations of said computerized user identifiers;

the user profile management task is performed, at least partially, in a location selected from:

the computerized call indication server, the called-receiver terminal, said user profile management task being integrated, at least partially, into a task selected from:

the task of intercommunicating communications terminal users, the task of requesting and receiving call indications, the specific task managing user profiles and combinations of said tasks;

a connection to the computer file access network, and combinations of said locations; and combinations of said characteristics.

* * * * *